United States Patent [19]

Cairns et al.

[11] 4,046,712
[45] Sept. 6, 1977

[54] CATALYSTS SPUTTERED ON SUBSTANTIALLY NONPOROUS LOW SURFACE AREA PARTICULATE SUPPORTS

[75] Inventors: James Anthony Cairns, Wantage; Richard Stuart Nelson, Goring on Thames; Rhydwyn William Barnfield, Cumnor Hill, all of England

[73] Assignee: United Kingdom Atomic Energy Authority, London, England

[21] Appl. No.: 587,281

[22] Filed: June 16, 1975

Related U.S. Application Data

[63] Continuation-in-part of Ser. No. 418,966, Nov. 26, 1973, abandoned, which is a continuation-in-part of Ser. No. 375,744, July 2, 1973, abandoned.

[30] Foreign Application Priority Data

Nov. 30, 1972 United Kingdom ............... 55466/72

[51] Int. Cl.$^2$ ........................ B01J 23/56; B01J 21/04; B01J 21/14; B01J 35/10
[52] U.S. Cl. ............................... 252/447; 204/192 C; 204/298; 252/410; 252/460; 252/466 PT; 252/472; 260/676 R; 260/677 H; 260/683 R; 260/690; 423/247
[58] Field of Search ................... 252/410, 477 R, 460, 252/466, 447, 472; 204/192, 298

[56] References Cited

U.S. PATENT DOCUMENTS

| | | | |
|---|---|---|---|
| 2,223,777 | 12/1940 | Beeck et al. | 252/477 R |
| 2,745,812 | 5/1956 | Ries, Jr. | 252/410 |
| 3,341,936 | 9/1967 | Sanstede | 252/472 |
| 3,472,751 | 10/1969 | King | 204/192 |
| 3,767,551 | 10/1973 | Lang, Jr. et al. | 204/192 |
| 3,773,894 | 11/1973 | Bernstein et al. | 252/474 |
| 3,795,783 | 3/1974 | Plumat et al. | 204/192 |
| 3,801,368 | 4/1974 | Fusayama et al. | 204/192 |
| 3,808,109 | 4/1974 | Schauer | 204/298 |

FOREIGN PATENT DOCUMENTS 312,227  4/1929  United Kingdom ................ 252/460

*Primary Examiner*—Winston A. Douglas
*Assistant Examiner*—P. E. Konopka
*Attorney, Agent, or Firm*—Larson, Taylor and Hinds

[57] ABSTRACT

In catalytic gas phase reactions there is used a catalyst comprising a sputtered deposit of catalytic material equivalent to between 0.5 and 5 monatomic layers upon a hard, substantially non-porous substrate. The substrate being hard and non-porous is of low surface area, that is not greater than 20 square meters per gram, and preferably comprises particles having a size in the range 0.1 micron to 0.5 centimeters.

4 Claims, 7 Drawing Figures

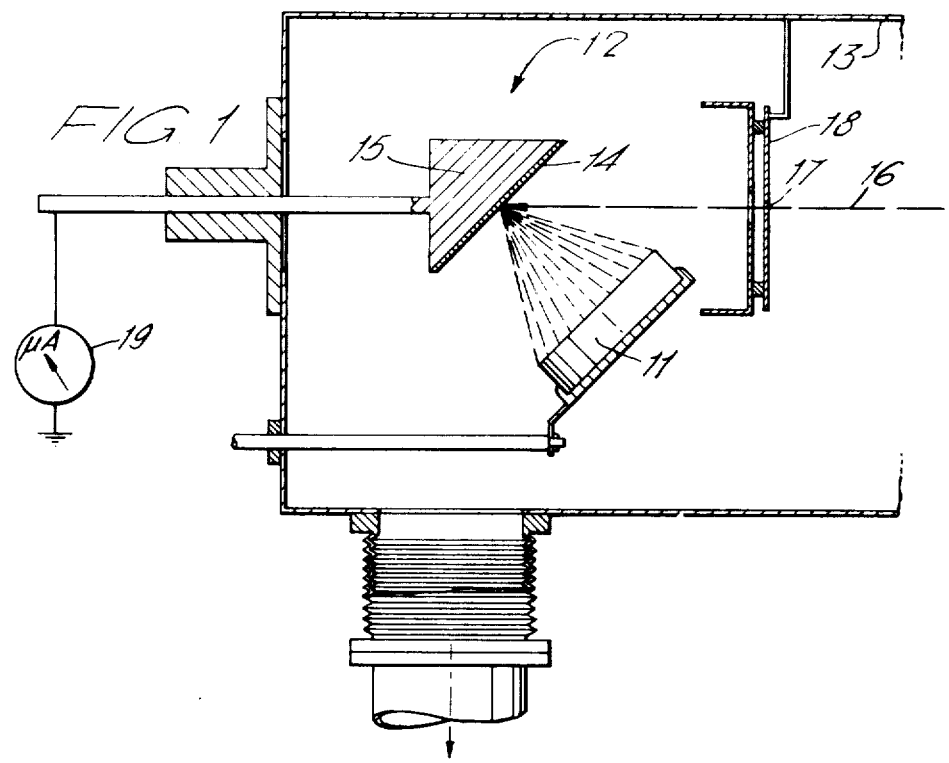
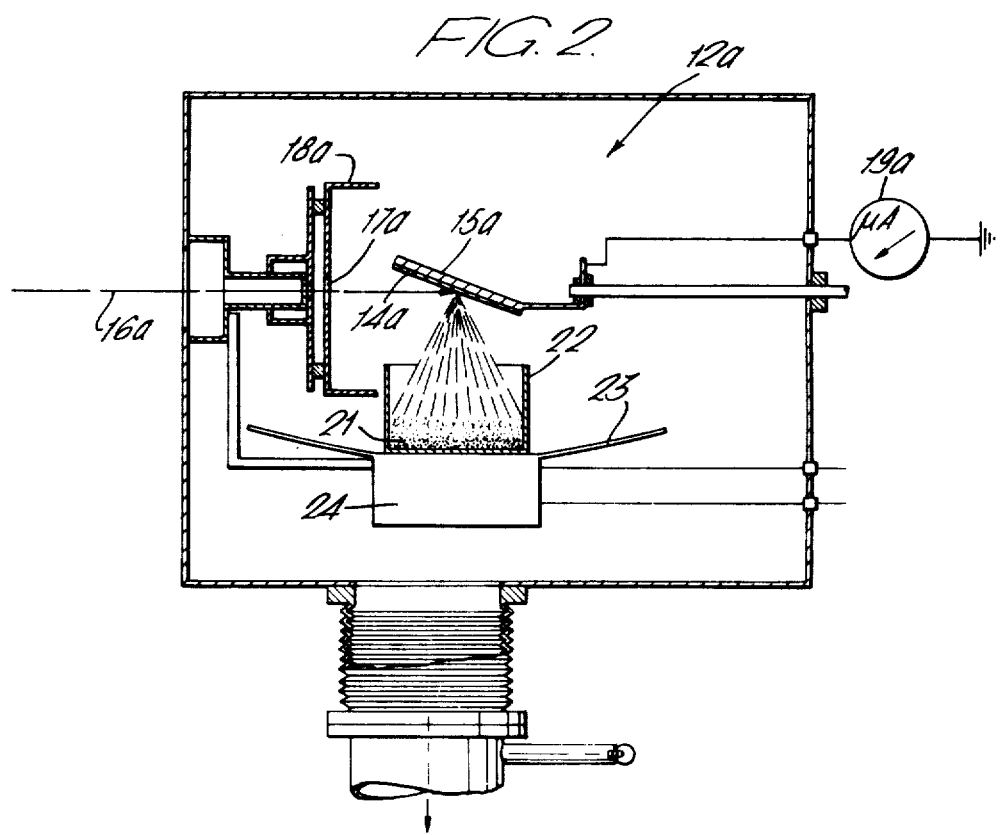

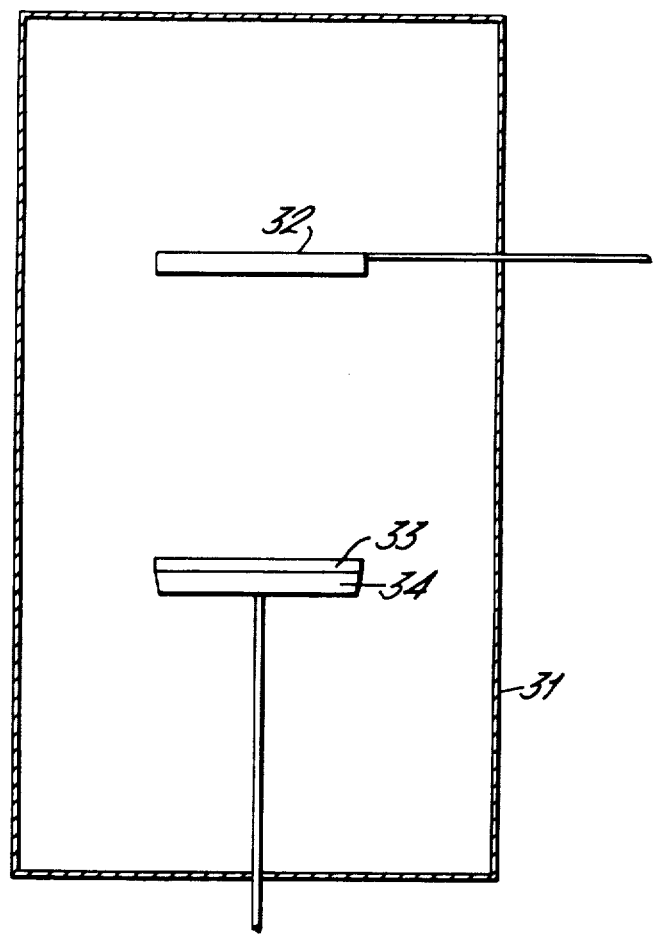

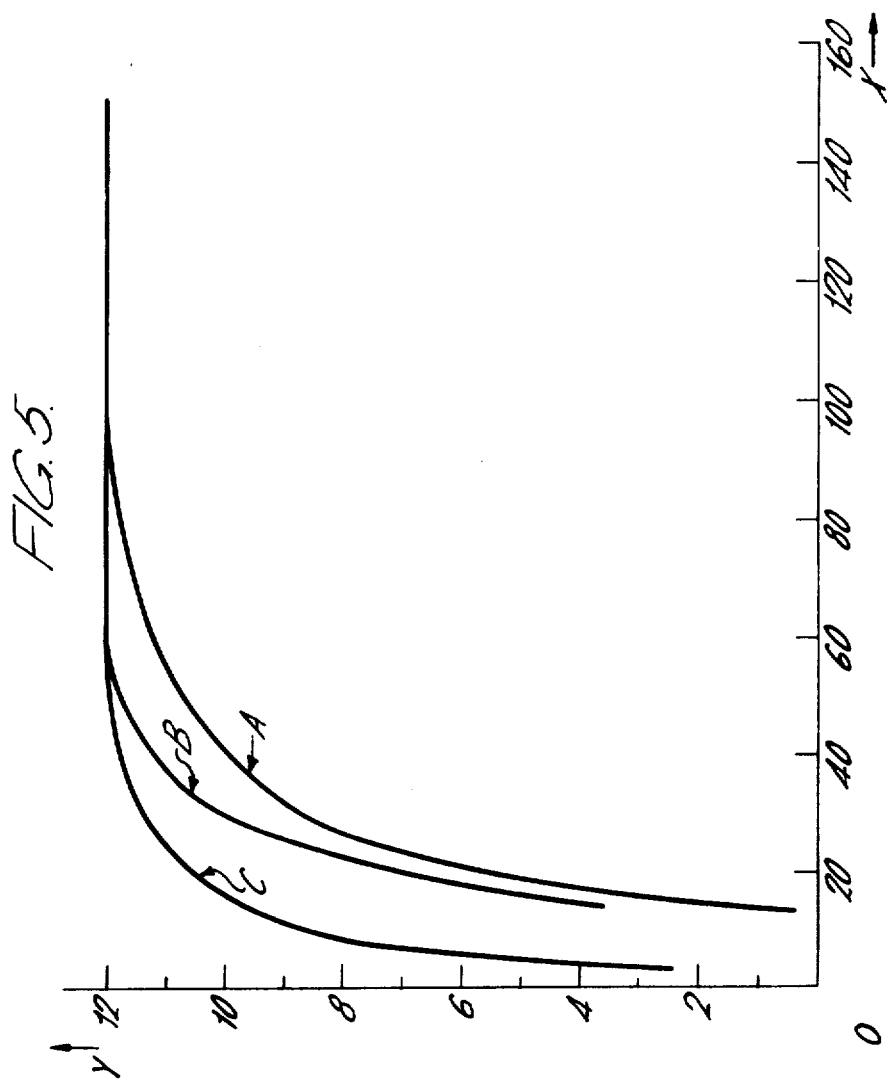

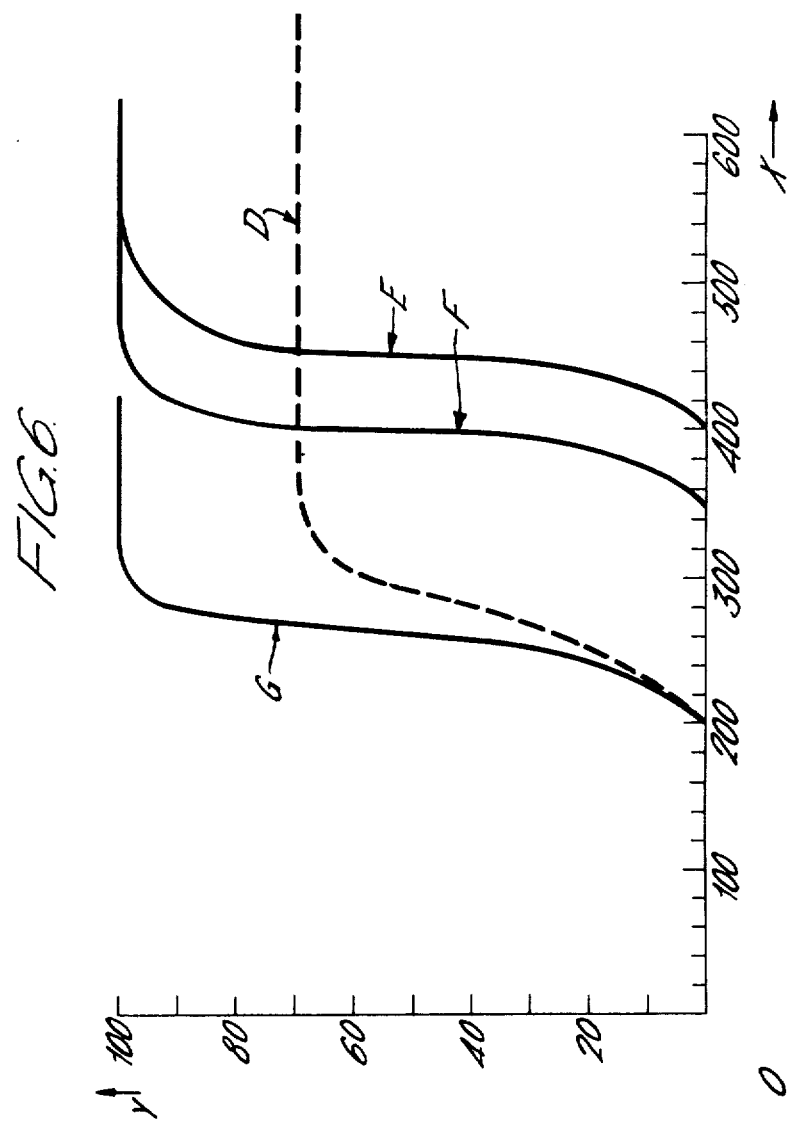

CATALYSTS SPUTTERED ON SUBSTANTIALLY NONPOROUS LOW SURFACE AREA PARTICULATE SUPPORTS

This application is a continuation-in-part of our co-pending application for United States Letters Patent Ser. No. 418,966 filed Nov. 26, 1973, now abandoned, itself a continuation-in-part of application Ser. No. 375,744 filed July 2, 1973, now abandoned.

BACKGROUND OF THE INVENTION

The invention relates to catalysts and to a method of use of catalysts in catalytic gas phase reactions.

Catalysis is a surface phenomenon and many catalytic materials are expensive (e.g. Platinum, Palladium). It is known to deposit the catalytic material upon a supporting substrate, which may be a porous body or a powder, with the object of obtaining a large exposed surface area from a given volume of the catalytic material.

Techniques generally used to deposit the catalytic material are vapour deposition, for example by decomposition of a gas passed over or through the substrate, or deposition of the catalytic material from a solution in which the substrate is immersed.

A problem faced in the manufacture of catalysts in particular for catalytic gas phase reactions is the durability or life of the catalyst when exposed to the severe environment and high temperature typical of many such reactions. The need for a large exposed surface area of substrate support conflicts with the durability requirement, since high surface area porous substrates are unstable at high temperatures and tend to sinter with consequent reduction in surface area and loss of catalytic activity.

We are aware that cathode sputtering of platinum onto a particulate substrate has been proposed for manufacturing a fluid electrode of high catalytic surface area.

SUMMARY OF THE INVENTION

Material deposited by sputtering is referred to herein as a sputtered deposit and is defined as a deposit derived from a target of material subjected to bombardment by energetic ions, the bombardment dislodging atoms of the material which are then deposited as an atomic dispersion upon any object placed close to the target.

The present invention is based upon the discovery that, if catalytic material is deposited by sputtering under carefully controlled conditions, it is possible to obtain catalytically active surface coatings for gas phase catalysis applications with very much smaller quantities of catalytic material than is possible by vapour deposition or deposition from solution. Furthermore, significantly greater activity per unit area of support can be achieved, as compared with catalyst deposited by a conventional technique.

Our present understanding of this discovery is based upon the following reasoning: the activity of a catalyst is dependent upon the number of active sites where catalyst atoms are held in exposed positions where they can interact with the components of the reaction to be catalysed. In conventional techniques for manufacturing catalysts, the number of active sites formed appears to be limited by the tendency for catalyst atoms to agglomerate into "clumps" of material on the surface. The formation of such clumps of material reduces significantly the number of exposed catalyst atoms. We believe improvement in catalytic activity is achieved if the catalytic material is deposited onto a substrate as a substantially atomic dispersion, the energy of the atoms impinging upon the substrate being such that the atoms are attached on the surface firmly enough to avoid or reduce the tendency of deposited atoms to move on the surface and agglomerate into clumps. If these deposition criteria are observed, the improvement is such that the need for extending the exposed surface area of the substrate support is reduced or even avoided. This discovery therefore opens up a new dimension in the manufacture of supported catalysts in particular for use in catalytic gas phase reactions. Thus the material and fabrication route of the support can be chosen to meet, for example, mounting constraints and hazards of the operating environment without the additional and very limiting constraint that the support should of necessity be so fabricated as to extend its exposed surface area.

In particular, a low surface area substrate support can be employed to give good durability under high temperature operation, whilst securing high catalytic activity. A hard, non-porous particulate substrate having a mean particle diameter in the range 0.1 micron to 0.5 centimeters is preferred. The surface area of such a substrate will not exceed approximately 20 square meters per gram which is to be compared with conventional porous catalyst supports which can have a surface area of several hundred square meters per gram. Sputtering of the catalytic material onto the particulate substrate provides a good atomic dispersion of the catalytic material and is a process susceptible of accurate control. Thus we have found that stopping the sputtering at a stage when there is still exposed substrate surface can be advantageous for some reactions. Alternatively when the reaction depends only upon availability of highly dispersed catalytic material and is independent of the substrate, then sputtering can be continued until the substrate is substantially wholly covered. Further, where a simple consideration of the nature of catalysis suggests a monatomic or monomolecular layer of catalytic material upon the substrate would be best, this may not necessarily be so. Sputtering does not build up a uniform monatomic layer but rather forms small clusters, each of a few atoms, scattered over the exposed substrate surface. As sputtering is continued new clusters form and existing clusters grow. For any given catalytic reaction there may be an optimum size of cluster for best efficiency for the reaction. This is readily achieved since the sputtering is easily and accurately controllable. In particular we have found that for gas phase catalytic oxidation reactions, the maximum efficiency is achieved if the sputtering is controlled to yield a surface coverage equivalent to between 0.5 and 5 monatomic layers.

According to the invention there is provided a catalyst comprising a particulate substrate of ceramic material or carbon having a mean particle diameter within the size range 0.1 micron to 0.5 centimeters and a surface area not greater than approximately 20 square meters per gram, and a sputtered deposit (as herein defined) of catalytic material upon the substrate.

Preferably the surface area of the particulate substrate is not greater than approximately 10 square meters per gram.

The substrate material is preferably alumina, although other oxides such as silica, ceria, yttria, zirconia or titania may possibly be used. Carbon may also be used as a substrate material.

The catalytic material preferably comprises one or more of the metals from the group comprising platinum, rhodium, palladium, ruthenium, osmium and iridium.

For depositing catalytic material by sputtering, it is possible for components of the catalytic material to be sputtered together or separately. For sputtering components together, a composite target may be employed. For example, for a platinum/rhodium catalytic material the target may comprise a platinum sheet with a strip of rhodium thereon. Alternatively, deposition of material which is a component of a catalytic system is followed by deposition of one or more other components which, either before or after reaction together, form the catalytic system. A catalytic system may be built up by depositing first a quantity of one component followed by a quantity of another component and repeating these steps in succession until the required compounded layer is built up.

The sputtering of a material which is catalytic, or which is a component of a catalytic system, onto a substrate is carried out by bombarding a source of the material in the neighbourhood of the substrate with energetic ions, the conditions of atmosphere and selectivity of ions permitted to bombard the material being such that co-deposition upon the substrate of unwanted material is avoided.

By energetic ions is meant ions having sufficient energy to cause useful sputtering of the source material. Impurities deposited upon the substrate from the atmosphere in which the sputtering is carried out, or impurities arising from deposition of the bombarding ions themselves upon the substrate, may render the catalyst inactive or diminish its activity. On the other hand, some impurities deposited in this way may be tolerated. We therefore propose that the conditions of atmosphere and selectivity of ions permitted to bombard the source material are carefully controlled to avoid impairing the activity of the product catalyst. Thus, by unwanted material is meant material which, in the quantity co-deposited in practice of the method unacceptably impairs the catalytic activity of the product.

Particularly good control of the process is obtained if the ions are provided by an ion beam from an accelerator, ion separator or an ion gun. In these circumstances we have found it necessary for the "atmosphere" to be a vacuum such that the mean free path of both ions and sputtered atoms is sufficient for efficient transfer and deposition of the sputtered atoms. Thus the vacuum should be of the order of or better than $10^{-4}$ Torr. Thus, in a preferred method of sputtering, the source material and substrate are mounted in a vacuum system and the source material is sputtered onto the substrate by bombarding the source material with a beam of ions from an accelerator or ion beam separator or an ion gun.

As is well known in the art, it is possible to produce ion beams containing a particular selected ion to a high degree of purity. Although high purity is not necessarily essential, it is necessary that the ion beam will not result in contamination of the deposited catalytic material. Consequently, in the method of the present invention, it is preferred to use a beam of inert gas ions such as Neon, Argon, Krypton, Xenon. Argon is preferred because it provides a good sputtering yield and is relatively inexpensive.

For sputtering onto particulate material, provision is made for vibrating the particles in the sputtering region. For this we prefer that the particles are spherical in shape and are preferably spheres of α-alumina formed by high temperature calcination of alumina gel spheres.

DESCRIPTION OF PREFERRED EMBODIMENTS

Specific catalysts embodying the invention and methods of manufacture and use thereof will now be described by way of example and with reference to the accompanying drawings, in which:

FIG. 1 is a diagrammatic sectional view of a target chamber of an ion accelerator with various components mounted therein;

FIG. 2 is a diagrammatic sectional view similar to FIG. 1 but illustrating components arranged for sputtering material onto a particulate substrate;

FIG. 3 is a diagrammatic illustration of a glow discharge arrangement;

FIGS. 5, 6 and 7 are graphs illustrating the performance of various catalysts.

Figure 4:
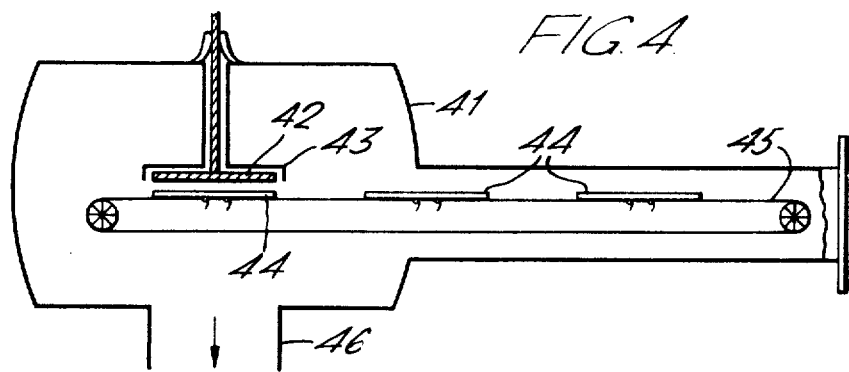
FIG. 4 is a diagrammatic illustration of a modified glow discharge arrangement.

An experimental demonstration of the discovery, referred to above, upon which the present invention is based was carried out using a plurality of porous alumina discs, of which one is shown at 11 in FIG. 1. The discs are approximately 2.5 cms diameter and 3 – 4 mm thick and have an exposed surface area of approximately 80 m²/gm.

A control disc was coated with $1.5 \times 10^{-3}$ grams of platinum by a conventional technique such as vapour deposition. To achieve a satisfactory level of catalytic activity and catalyst lifetime, it has been found necessary to employ at least about $1.5 \times 10^{-3}$ grams of platinum on a sample disc of the size specified when conventional platinum deposition techniques are used.

The experimental discs 11 were each mounted in the vacuum system 12 (approximately $5 \times 10^{-6}$ Torr) of an ion accelerator, the beam tube of which is illustrated at 13. A target of pure platinum 14 on a holder 15 is mounted, also within the vacuum system 12, in the path 16 of the ion beam, which emerges from aperture 17 in secondary electron suppressor electrode 18.

A beam of argon ions of energy 90 KeV was used and the weight of platinum deposited by sputtering onto the disc 11 was capable of accurate control by controlling the intensity and duration of the ion beam bombardment. In this example, the ion beam current is capable of variation from 2 microamps to 50 microamps and is measured by meter 19 connected between the target 14 and ground. The arrangement of platinum target 14 at 45° to the ion beam and the disc 11 substantially on the normal to the target 14 is chosen with a view to achieving efficient capture of sputtered platinum. Discs were prepared in this way with estimated deposited weights of platinum ranging from $5 \times 10^{-4}$ grams to $4 \times 10^{-6}$ grams.

The catalysts thus prepared were tested upon the catalytic hydrogenation of butadiene. The complete hydrogenation of butadiene yields butane, but intermediate products can be formed, as represented by the following:

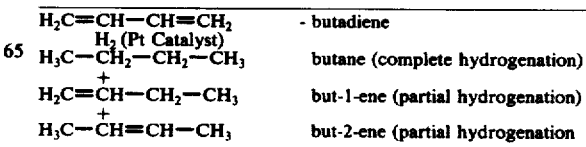

-continued

- two forms exist - cis and trans).

A metered quantity of butadiene and hydrogen was passed over the catalyst under test and re-circulated. Samples of product gas were withdrawn at timed intervals and analysed by a gas chromatograph.

However, two blanks were first run, that is using alumina substrate discs with no platinum deposited thereon, firstly circulating butadiene alone and secondly butadiene with hydrogen. In both cases, no change in gas composition was observed.

In the tests, catalytic activity was assessed by measuring the yield of butane and any intermediates and the time taken to reach these yields.

The results are summarised by the graph of FIG. 5 in which the OX axis represents time in minutes and the OY axis represents butane yield in arbitrary units. Curve A represents the yield using the control disc coated with $1.5 \times 10^{-3}$ grams of platinum catalyst by a conventional technique. Curve B represents the butane yield using a sputtered platinum catalyst of $6.25 \times 10^{-5}$ grams of platinum. Curve C represents the butane yield using a sputtered platinum catalyst of $1.25 \times 10^{-4}$ grams of platinum. From these curves it is apparent that, using the sputtering technique, a catalyst of activity greater than that of a conventionally prepared catalyst is achieved with quantities of platinum an order of magnitude smaller. Indeed, in further comparative experiments samples with down to approximately 1/400th of the weight of platinum of the conventional control sample exhibited an eventual yield of butane comparable with the control sample.

It was noted that the catalytic reactivity varied over the range of samples, indicating a capability of exercising control over the yield of intermediate reaction products.

Thus, the sample containing 1/400th by weight of platinum compared with the control exhibited low reactivity so that the formation of intermediates was readily observed.

A sample containing approximately 1/800th by weight of platinum compared with the control exhibited no observable catalytic activity.

Electron Spectroscopy for Chemical Analysis (ESCA) has been applied to the samples and indicates that samples containing as little as $1.5 \times 10^{-5}$ grams of platinum deposited by the above described method have as much available platinum on the surface as has a conventional catalyst containing $1.5 \times 10^{-3}$ grams of platinum. This result is entirely consistent with the comparative catalytic measurements. Where the quantity of platinum deposited was chosen to be equivalent to substantially a monatomic layer (discussed more fully hereinafter), we have found that the number of available platinum atoms on the surface corresponds closely with the number of atoms deposited. Absorption measurements have confirmed the ESCA findings.

Further porous alumina discs coated with platinum by the sputtering technique described above were tested upon the catalytic oxidation of carbon monoxide.

In these experiments a slug of a gaseous mixture containing a 1:1 by volume ratio of carbon monoxide and oxygen in helium carrier was passed once through the coated alumina disc. The product slug was then analysed. Each slug of gaseous mixture was 50 microliters and the flow rate through the disc was 245 ccs/minute. The results, for various loadings are shown in FIG. 6 and compared with pure platinum foil (curve D) of surface area 8 cm$^2$. This provides approximately $1.3 \times 10^{16}$ surface atoms. The OX axis represents temperature in °C and the OY axis represents percentage conversion of the carbon monoxide. Curve E was obtained with a disc coated by sputtering with $1.8 \times 10^{-8}$ grams of platinum corresponding to approximately $5.5 \times 10^{13}$ platinum atoms. Curve F was obtained with a disc coated by sputtering with $1.3 \times 10^{-7}$ grams of platinum corresponding to approximately $4.0 \times 10^{14}$ platinum atoms. Curve G was obtained with a disc coated with $7.8 \times 10^{-6}$ grams of platinum corresponding to approximately $2.3 \times 10^{16}$ platinum atoms.

As may be seen, at the space velocities employed in the tests, all the catalysts comprising platinum sputtered on porous alumina were capable of providing 100% conversion as compared with a maximum of approximately 70% for the platinum foil.

The behaviour of the catalysts is characteristic of that expected from a conventional catalyst in that the reaction proceeds only above a certain temperature (the "light-off" temperature) before going to completion within a further small temperature increase. Decreasing the platinum loadings of the catalyst raises the light-off temperature, since this is very sensitive to the number of available active sites.

It is an important feature of our inventive discovery that using our sputtering technique, the need for an extended surface area support is very significantly reduced. This is demonstrated by a further experiment summarised by FIG. 7. In this experiment single crystals of alumina (sapphire) each of total surface area 2 cm$^2$ were respectively coated with different quantities of platinum by our sputtering technique described above. Each coated crystal was tested on the catalytic oxidation of carbon monoxide using identical conditions to those described above for the coated disc tests.

Figure 7:
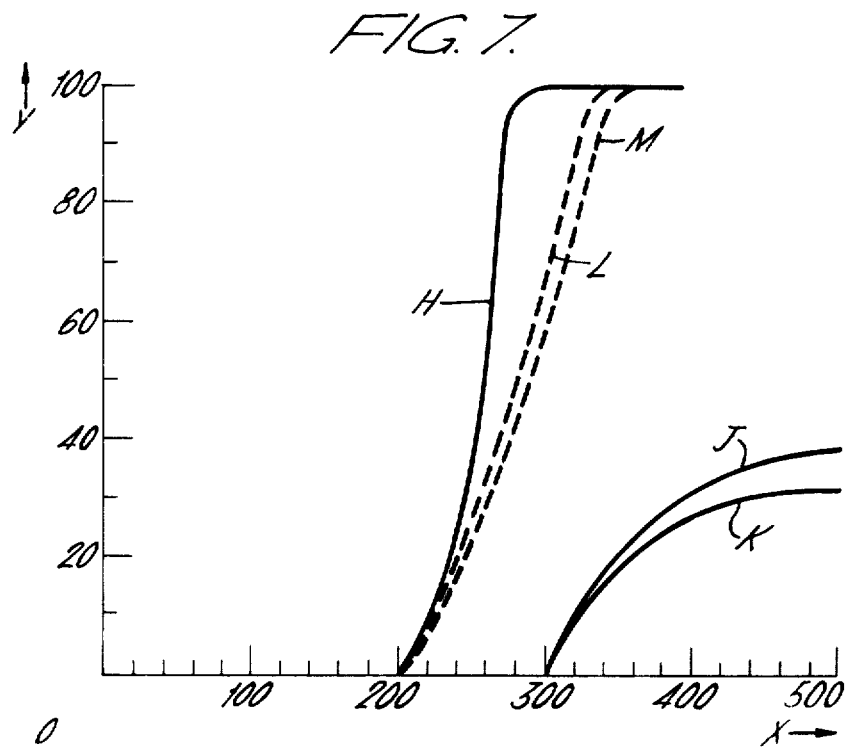

In the graph of FIG. 7 the OX axis represents temperature in °C whilst the OY axis represents percentage conversion of the carbon monoxide. Curve H was obtained with a crystal coated with approximately $2.4 \times 10^{15}$ platinum atoms per cm$^2$. This corresponds to approximately two monatomic layers of platinum. Curve J was obtained with a crystal coated with approximately $2.4 \times 10^{14}$ platinum atoms per cm$^2$. This corresponds to approximately 0.2 monatomic layer of platinum. Curve K was obtained with a crystal coated with approximately $2.4 \times 10^{13}$ platinum atoms per cm$^2$. This corresponds to approximately 0.02 monatomic layer of platinum.

It will be seen that the performance of $2.4 \times 10^{15}$ platinum atoms/cm$^2$ in two monatomic layers on 2 cm$^2$ of single crystal alumina is comparable with $2.3 \times 10^{16}$ platinum atoms (see FIG. 6) widely dispersed on a porous alumina substrate of high exposed surface area.

The graph of FIG. 7 also shows a somewhat paradoxical result of heat treatment of the various samples for 15 minutes at 1100° C. Thus the sample (2 monatomic layer) which gave curve H, after the heat treatment showed slightly diminished activity — dashed curve L. The sample (0.2 monatomic layer) which gave curve J, after the heat treatment showed a remarkable increase in activity to dashed curve M. The heat treatment of the sample (0.02 monatomic layer) which gave curve K produced no significant change.

These results of heat treatment are not fully understood, but it appears possible that particular groupings of platinum and alumina atoms may be desirable for maximum catalytic activity and that the heat treatment, in causing some atomic rearrangement, degraded advantageous groupings in the first sample but assisted their formation in the second sample.

In accordance with the invention the above described discoveries are applied in the manufacture of a catalyst having high durability at high temperatures by depositing catalytic material by controlled sputtering onto low surface area particulate material.

For this, apparatus as shown in FIG. 2 is employed. In FIG. 2 similar components to those shown in FIG. 1 have been referenced with the same numerals, distinguished by the suffix a. The modifications, for enabling sputtering onto particulate material are as follows:

The particulate material 21 in a container 22 is mounted upon the diaphragm 23 of a loudspeaker 24. Since the base of the container 22 has to be substantially horizontal, the geometry of the arrangement, for efficient capture by the particulate material 21 of platinum sputtered from the target 14a, is different from FIG. 1. As may be seen from FIG. 2, the target 14 is more steeply inclined to the ion beam path 16a.

To carry out the sputtering of platinum from the target 14a onto the particulate material 21, the loudspeaker is energised by an audio frequency signal generator whilst the target 14a is bombarded with ions of inert gas, as in the first experiment. The audio frequency vibration of the diaphragm 23 keeps the particulate material 21 in constant movement so that a substantially homogeneous deposition of platinum on the particulate material is achieved.

An alternative technique is illustrated diagrammatically in FIG. 3. In this arrangement a vacuum vessel 31 contains an inert gas, for example argon, a platinum electrode 32, and a substrate 33 which, in this example, is mounted upon a second electrode 34. A voltage is applied across the electrodes and the argon pumped down so that a glow discharge is set up between the electrodes. Energetic ions from the glow discharge plasma bombard the platinum 32 which is thereby sputtered onto the substrate 33.

FIG. 4 illustrates a modification and development from the arrangement of FIG. 3. Vacuum vessel 41 contains an inert gas, for example, argon and a modified glow discharge electrode arrangement in which platinum cathode 42 is located close to and screened on all but one face by anode 43. With this arrangement, when −3 KeV is applied to the cathode with argon gas pressure pumped down via conduit 46 to approximately 50 micrometers of mercury a glow discharge in the gas is set up. Positive gas ions bombard the cathode 42 and, with the geometry as shown, a uniform sputtering from the cathode 42 is produced. Samples 44, which may be electrically insulating or conducting, are mounted on a conveyor belt 45 to be brought in succession into position for coating with sputtered platinum. A vibrator (not shown) for use in coating particulate material is arranged to operate on the conveyor belt 45 in the region where it passes under the cathode 42.

The following examples embodying the invention describe the manufacture of catalysts using particulate material substrates coated with sputtered catalytic material and the use of such catalysts in gas phase catalytic reactions.

EXAMPLE I

Hard, substantially non-porous alumina particles of 1 millimeter diameter were coated with platinum by sputtering in the apparatus above described.

The platinum loading, that is the ratio of weight of platinum to weight of alumina substrate, was 0.0006%. This represents a quantity of platinum approximately equivalent to monatomic coverage of the surface area of the alumina particles.

1 Gram of the platinised particles was loaded into a microcatalytic reactor and 100 microliter slugs of a mixture of equal volumes of oxygen and carbon monoxide passed through. It was found that complete oxidation of the carbon monoxide occurred at 235° C.

EXAMPLE II

A powder of hard substantially non-porous α-alumina spheres of sizes ranging from 1 micron to 5 microns, manufactured by a high temperature calcination (1100° C for 12 hours in air) of alumina gel spheres was coated with platinum by sputtering in the apparatus above described.

The platinum loading was 0.7%, a quantity of platinum approximately equivalent to monatomic coverage of the surface area of the alumina powder.

100 Micrograms of this platinised powder was loaded into a microcatalytic reactor and 100 microliter slugs of a mixture of equal volumes of carbon monoxide and oxygen passed over the powder at a velocity of 30 ccs/minute. The performance as a function of temperature was tested and the catalyst was found to be extremely active showing a "light-off" temperature of approximately 60° C and steeply increasing percentage conversion to 100% conversion at about 75° to 80° C.

A relatively fine powder such as described in Example II will generally require in practice to be supported upon a substrate of larger structural dimensions to protect the powder particles and permit access of the gases to the powder particles. For example, when the platinised powder of Example II was dispersed upon a foamed alumina support and tested in the microcatalytic reactor very high activity was achieved. Specifically, 0.393 grams of catalyst (platinised spheres 1 - 5 μm of alumina dispersed upon foamed alumina) with a platinum loading of 0.36% and using gas slugs of 100 μl mixtures ures of equal volumes of carbon monoxide and oxygen at 30 ccs/minute revealed "light-off" at below 20° C and a rapid increase in percentage conversion to 100% at just above 20° C.

EXAMPLE III

A particularly interesting catalyst is arrived at by adhering powder particles of 1 - 5 μm alumina spheres platinised as in Example II onto larger diameter (100 micron) alumina spheres also prepared by high temperature calcination of alumina gel spheres. Thus the supporting substrate does not absorb t he smaller size platinised spheres but depends upon the tendency of the smaller spheres to adhere to the hard substantially non-porous surface of the larger spheres. This catalyst proved effective for a number of reactions and, by way of example, a test sample of 0.28 grams with platinum loading 0.29% acting upon a propane and oxygen mixture in slugs of 100 microliters and gas velocity 30 ccs/minute exhibited "light-off" at about 235° C and steeply increasing percentage conversion up to 100% conversion at about 250° C.

The foregoing examples illustrate the effectiveness of our catalysts comprising hard, durable, low surface area particulate substrate material with catalytic material deposited by sputtering. For the range of particle size specified, where these are hard and substantially non-porous alumina spheres, the surface area ranges from 3.4 cms$^2$/gram (for 50 millimeter spheres) to 17 m$^2$/gram (for 0.1 micron spheres) thus demonstrating the remarkable effectiveness of the catalysts for catalytic gas phase reactions in spite of the very low substrate surface area per gram as compared with conventional catalysts.

The invention is not restricted to the details of the foregoing examples. For instance, it is envisaged that other techniques for sputtering may be employed, possibly using arc discharge, although, in this case, particular care is probably required to avoid contamination of the catalyst.

Further, the technique of the invention provides for controlled deposition of very fine layers, for example substantially monatomic layers, of selected materials. It is thus possible to build up alloys or well dispersed mixtures of two or more materials which, either before or after reaction together, provide a catalytic system. This may be achieved by successive sputtering from targets of the separate components of the system, or possibly by simultaneous sputtering from separate targets using a split ion beam or twin beams for bombarding the targets. Alternatively, a composite target may be used in which case a glow discharge sputtering apparatus or a scanned ion beam would be necessary to sputter from a representative area of the target. Treatment, for example heat treatment, may be required to cause the deposited components to inter-react to form a compound catalytic system. A wide range of alloys or mixtures is of interest as the choice depends upon the reaction to be catalysed. One example is the promotion of platinum by alloying with other metals, e.g. iridium or rhodium.

It is readily practicable to generate inert gas ion beams with an intensity of the order of 100 milliamps. With such beam intensity, treatment time is sufficiently short for continuous production of catalyst on substrate moved through the target area on a conveyor system. This may be appreciated from the fact that treatment times in the foregoing examples were of the order of 2 minutes for coating the area of the specified alumina discs. With beams of 100 milliamp intensity, this treatment time is readily cut to the order of one second. More quantitatively, with 100 milliamp beam, it is possible to coat a square meter of substrate with catalytic material in a time of the order of 1 minute.

It is particularly convenient to use a loudspeaker for vibrating a particulate material whilst the catalytic material or component is sputtered onto the particulate material. However, other techniques have been envisaged. Again continuous treatment is practicable and, for this, streams of particulate material may be moved through the sputtering region under any suitable conditions for exposing all or most of the particulate material to the action of the sputtered material. Thus, for example, the particulate material may be tumbled through the sputtering region or, as in FIG. 4, transported on a conveyor which passes over a vibrator (such as a loudspeaker) in the sputtering region.

The energy of the bombarding inert gas ion beam can be varied over quite a wide range but should be so chosen as to provide a sufficient yield of particles possessing an acceptable energy spread.

The vacuum pumped in the target chamber is not critical except that it should be sufficient to prevent unacceptable contamination of the catalyst and, as discussed above, should provide adequate mean free path for ions and sputtered atoms for efficient transport of the ion beam and of the sputtered atoms onto the target.

The ion beam may be scanned to improve uniformity of coating upon the target material.

We claim:

1. A catalyst comprising a hard, substantially nonporous particulate substrate selected from the group consisting of ceramic material and carbon and having a mean particle diameter within the size range 0.1 micron to 0.5 centimeters and a surface area not greater than approximately 20 square meters per gram, and a sputtered deposit of catalytic material comprising one or more of the metals from the group platinum, rhodium, palladium, ruthenium, osmium and iridium upon the substrate, said deposit of said catalytic material having been deposited by bombardment of said catalytic material with energetic ions, the bombardment dislodging atoms of said catalytic material which are then deposited as an atomic dispersion upon the substrate.

2. A catalyst as claimed in claim 1, wherein the sputtered deposit of catalytic material comprises a quantity of catalytic material equivalent to between 0.5 and 5 monatomic layers upon the substrate surface.

3. A catalyst as claimed in claim 1, wherein the surface area of the particulate substrate is not greater than approximately 10 square meters per gram.

4. A catalyst as claimed in claim 1, wherein the ceramic material comprises alumina.

* * * * *